(12) United States Patent
Chen

(10) Patent No.: US 7,461,264 B2
(45) Date of Patent: Dec. 2, 2008

(54) METHOD FOR AUTOMATIC IDENTIFICATION CONTROL AND MANAGEMENT

(75) Inventor: Magary Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 732 days.

(21) Appl. No.: 10/962,098

(22) Filed: Oct. 12, 2004

(65) Prior Publication Data
US 2005/0235156 A1 Oct. 20, 2005

(30) Foreign Application Priority Data
Apr. 9, 2004 (TW) .............. 93110023 A

(51) Int. Cl.
H04L 9/00 (2006.01)
H04L 9/32 (2006.01)

(52) U.S. Cl. .............. 713/182; 713/168; 726/20; 380/229; 705/66; 235/380

(58) Field of Classification Search ............... 726/9, 726/20; 713/168, 172–174; 380/229; 705/44, 705/65–69; 340/10.51, 572.1; 235/380
See application file for complete search history.

(56) References Cited

U.S. PATENT DOCUMENTS

| 5,629,981 | A * | 5/1997 | Nerlikar | 713/168 |
| 6,226,752 | B1 * | 5/2001 | Gupta et al. | 726/9 |
| 6,308,268 | B1 * | 10/2001 | Audebert | 713/182 |
| 6,510,517 | B1 * | 1/2003 | Bruhnke et al. | 713/168 |
| 6,842,106 | B2 * | 1/2005 | Hughes et al. | 340/5.8 |
| 7,333,001 | B2 * | 2/2008 | Lane et al. | 340/10.1 |
| 2005/0193198 | A1 * | 9/2005 | Livowsky | 713/168 |
| 2007/0265964 | A1 * | 11/2007 | Berardi et al. | 705/44 |

* cited by examiner

Primary Examiner—Minh Dieu Nguyen
(74) Attorney, Agent, or Firm—Rosenberg, Klein & Lee

(57) ABSTRACT

An automatic control and management method for identification by using an identity equipment is proposed. The method includes using a login system to generate an identity certificate code; using a password to encode the identity certificate code and a unique random variable to generate an identity value; and generating an on-line connection verification data by using the identity certificate code and then storing the same into the login system. The process for logging in the login system includes using a portable identity equipment and inputting a password for identification so as to read out the encoded data. If disconnection occurs the login system automatically logs out to protect the confidential data. Thus, the identity equipment used in the present invention can be easily carried away.

11 Claims, 11 Drawing Sheets

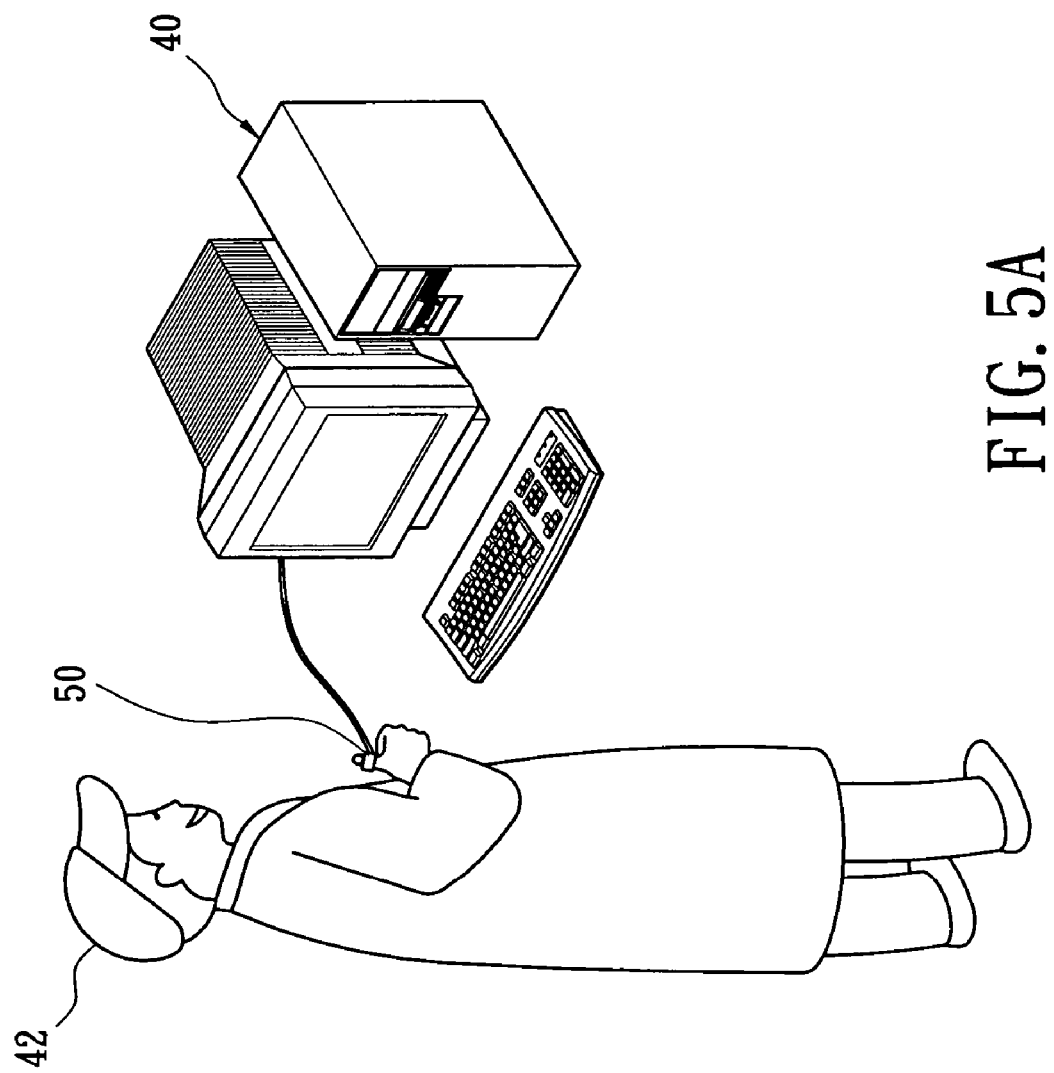

METHOD FOR AUTOMATIC IDENTIFICATION CONTROL AND MANAGEMENT

This Nonprovisional application claims priority under 35 U.S.C. § 119(a) on Patent Application No(s). 93110023 filed in Taiwan, Republic of China on Apr. 9, 2004, the entire contents of which are hereby incorporated by reference.

FIELD OF THE INVENTION

The present invention is related to a method for automatic identification control and management. In the present invention, when an identification device is disconnected from a login system, the login system will log out automatically for sake of information security. Thus, the identification device can be made in a portable manner.

BACKGROUND OF THE INVENTION

Regardless of individuals or enterprises, people rely much on the information equipment and storage device to process or store bulk data nowadays. As a result, information security becomes a pressing issue recently.

In order to prevent data from being leaked out, the present computers, including desktops or notebook computers, have various protection functions. They employ passwords, fingerprint information, retina information or integrated circuit (IC) card to keep unauthorized users from accessing the data. Advantages and disadvantages of these methods are discussed as follows.

It is the most popular that the identification mechanism employs a password to log into a system as shown in FIG. 1. The user only needs to use a personal account 11 and password 13 to log into the system, such as a computer 10, a website or the like. However, since the account 11 and password 13 are fixed, it will cause a security problem if the password is forgotten, intercepted or modified.

Furthermore, the account and the password are issued mostly by a specific authorized organization. However, the internal staffs of the organization can steal the account and the password easily. Besides, if the user forgets to log out after use, the interval before automatic logout is sufficient for an unauthorized person to steal or damage user's data.

The biological identification mechanism as shown in FIG. 2 employs a fingerprint reader 20 of a login computer 10 to read user's unique biological information, i.e. fingerprint information, for identification. Although the biological information is unique for every person, the recognition capability and accuracy still need improving before this technology is widely used. Even though this technology is used, the interval before automatic logout is still sufficient for an unauthorized person to steal or damage user's data if the user forgets to log out after use.

FIG. 3 shows a chip card 32 for identification. Using the chip card 32 to log in the computer 10, access a management system or the like is the optimal identification mechanism. The chip card 32 can be a Radio Frequency Identification card (RFID card), a contact IC card, a traditional magnetic card or a bar-code card storing identification information. During identification, an identification reader 30 reads the identification information recorded on the chip card 32 to identify user's identity. A password or other re-confirmation mechanisms can also be used to improve the protection capability. However, if the chip card 32 is lost or not taken back after use, the chip card 32 may be duplicated or replaced by other persons. Hence, an unauthorized person still has chances to steal the confidential data.

The RFID method mentioned above transmits data through radio frequency. The identification mechanism using identity (ID) cards made according to this technology is the major identification method nowadays. The ID card can be compact and have various shapes. Thus, it can be portable and easily hidden. The identification mechanism using RFID technology can take the place of the fingerprint readers and chip card readers.

An embodiment of the present invention employs identification and auto-logout mechanisms together with the RFID mechanism to provide a wireless identification method and an automatic identification system. Thereby, the present invention can prevent the confidential data from leakage caused by the incomplete identification mechanism of the prior art or user's carelessness.

SUMMARY OF THE INVENTION

The present invention is a method for automatic identification control and management. The present invention can prevent the data from being leaked out or stolen because of the incomplete identification mechanism of the prior art or user's carelessness.

The present invention includes processes for installation of identity equipments, login of the host, and auto-logout of the host. The present invention includes a process to handle the installation of the identity equipments and generate on-line identification keys and an identity values, a process to log in the host and decode the encrypted identification key and the identity value in order for comparison with an identification key, a process to analyze in a cyclic manner the connection condition between the identity equipment and the host after login, and a process to auto-logout the system when disconnection occurs between the identity equipment and the host.

The auto-logout process is activated immediately after the installation and login process are performed. The auto-logout process includes a sub-process for cyclic analysis of the identity value to detect the connection condition between the identity equipment and the host, and a sub-process for auto-logout of the system when disconnection occurs between the identity equipment and the host. The auto-logout process blocks unauthorized access, prevents data leakage and secures confidential information.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 5A is a diagram of a second embodiment of the present invention;

DESCRIPTION OF THE PREFERRED EMBODIMENTS

Figure 1:
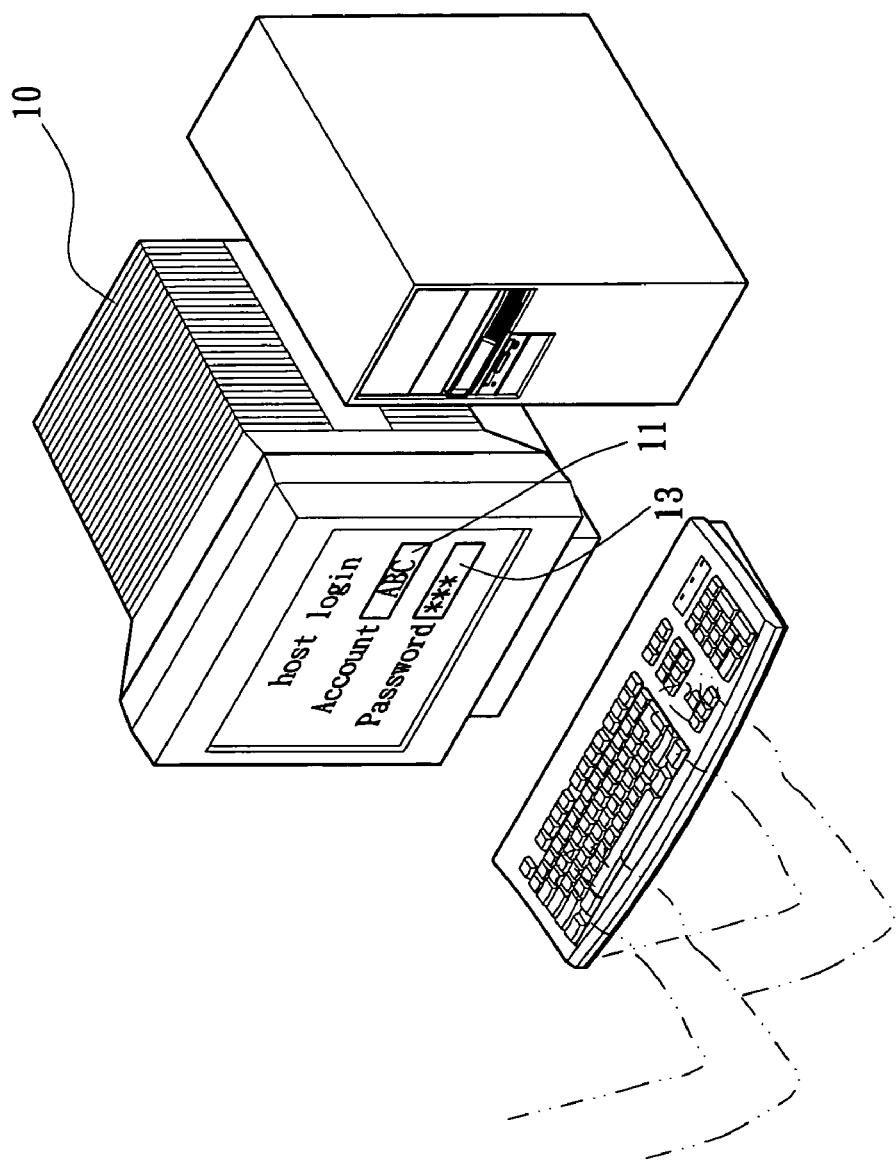
FIG. 1 is a diagram of a conventional identification system using accounts and passwords.
Figure 2:
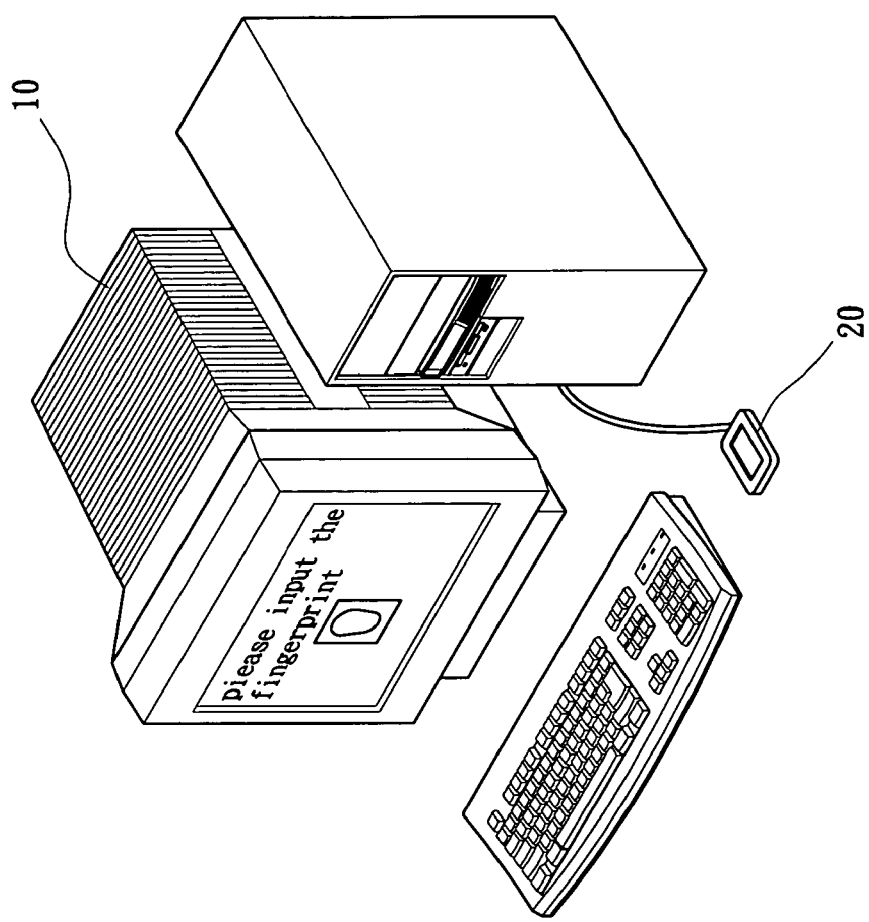
FIG. 2 is a diagram of a conventional identification system using fingerprint information.
Figure 3:
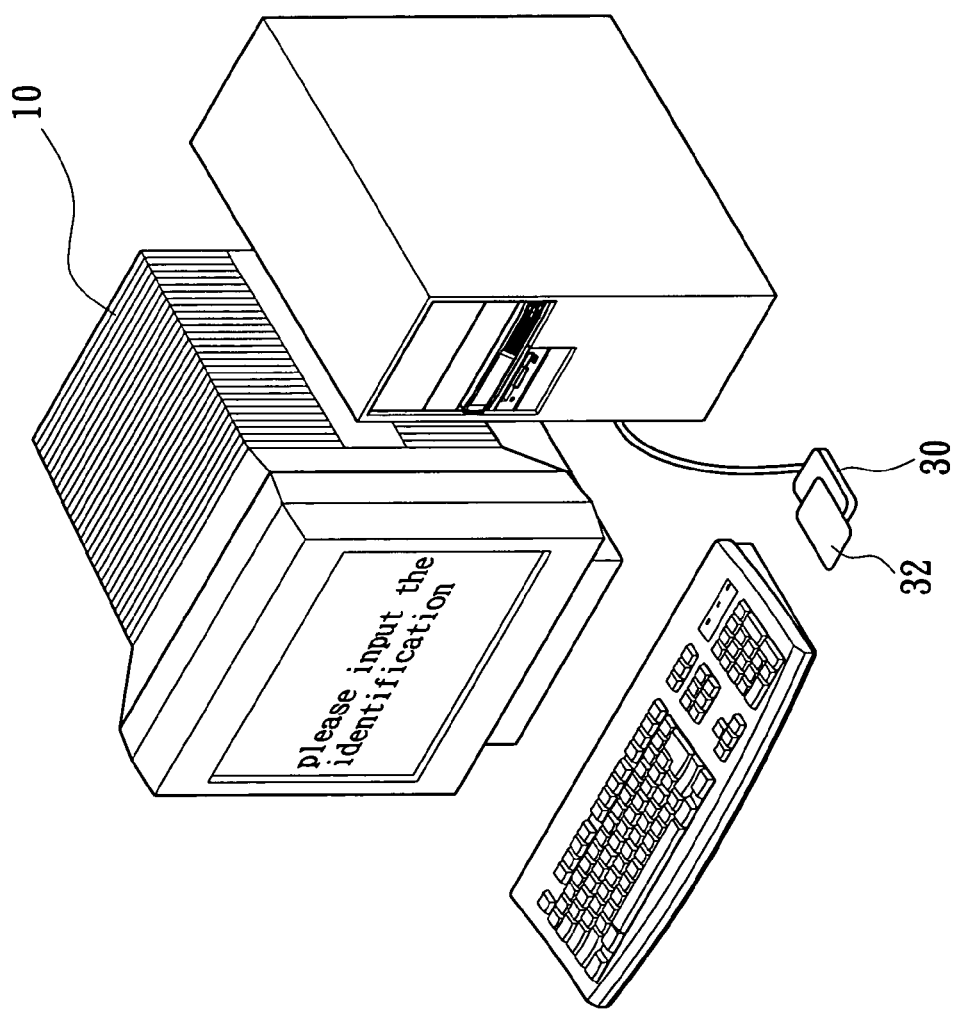
FIG. 3 is a diagram of a conventional identification system using IC cards.
Figure 4A:
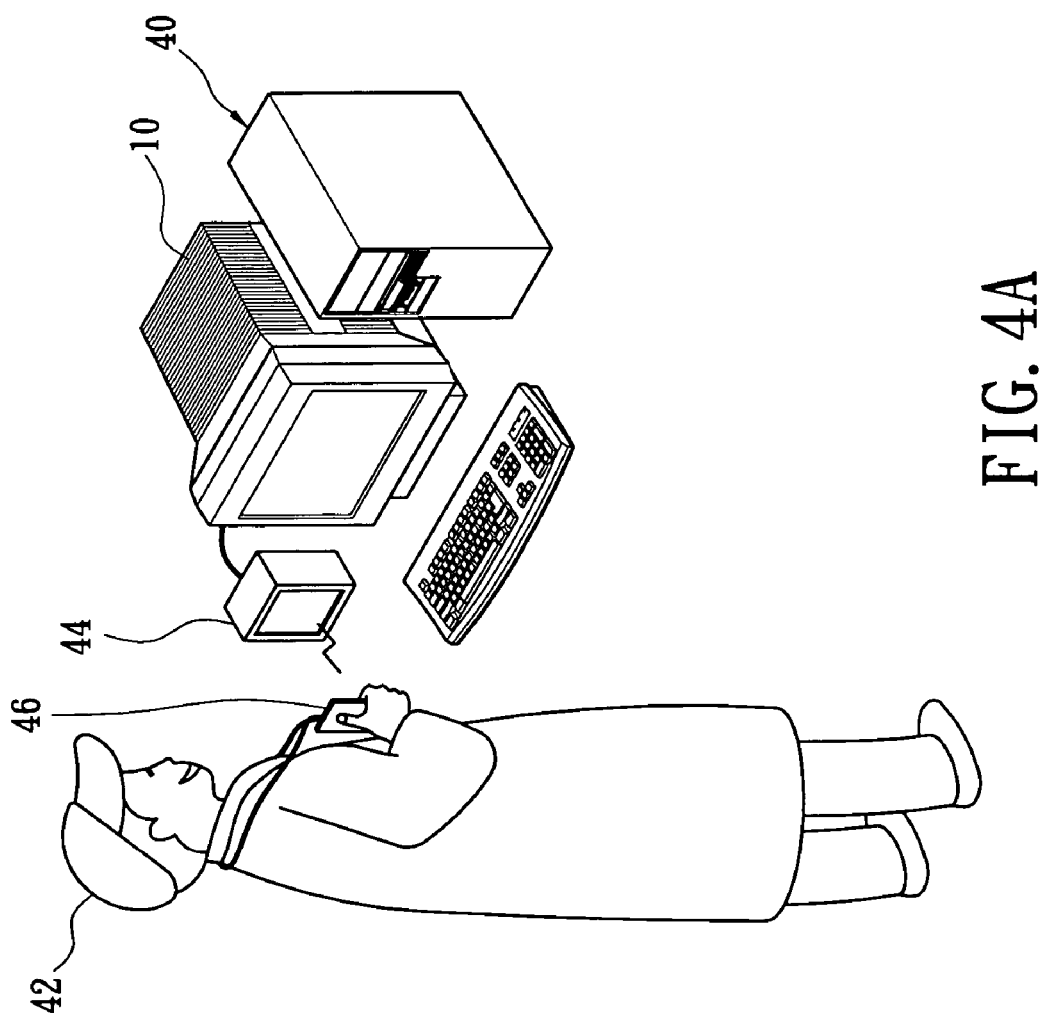
FIG. 4A is a diagram of a first embodiment of the present invention.

The present invention is an automatic control and management system for identification. Reference is made to FIG. 4A, which is the first embodiment of the present invention. It employs the RFID technique to transmit data in a wireless manner. In the present invention, the user 42 needs to carry the portable identity equipment 46, i.e. an ID card, which is manufactured according to the RFID technique. Thereby, the system of the present invention can identify the identity of the user 42 by communicating with the portable identity equipment 46.

In this embodiment, a host 40 is internally or externally connected to an identification receiver 44. When the user 42 approaches the detection area of the identification receiver 44, the portable identity equipment 46 immediately establishes a connection with the identification receiver 44. The connection process can be used to identify the identity of the user 42. Meanwhile, the connection process can also cooperate with the internal access control process of the login process of the host 40 to analyze the access authority of the user 42. When disconnection occurs, e.g. the user 42 leaves the detection area of the host 40, the system automatically logs out to prevent the leakage or damage of the data stored inside the host 40.

As mentioned above, the portable identity equipment 46 can communicate with the identification receiver 44 to identify the identity of the user 42. Furthermore, the present invention can be used together with an account and a password for the user 42 or his group, such as a division or a department of a company, to enhance the identification capability of the system.

Figure 4B:
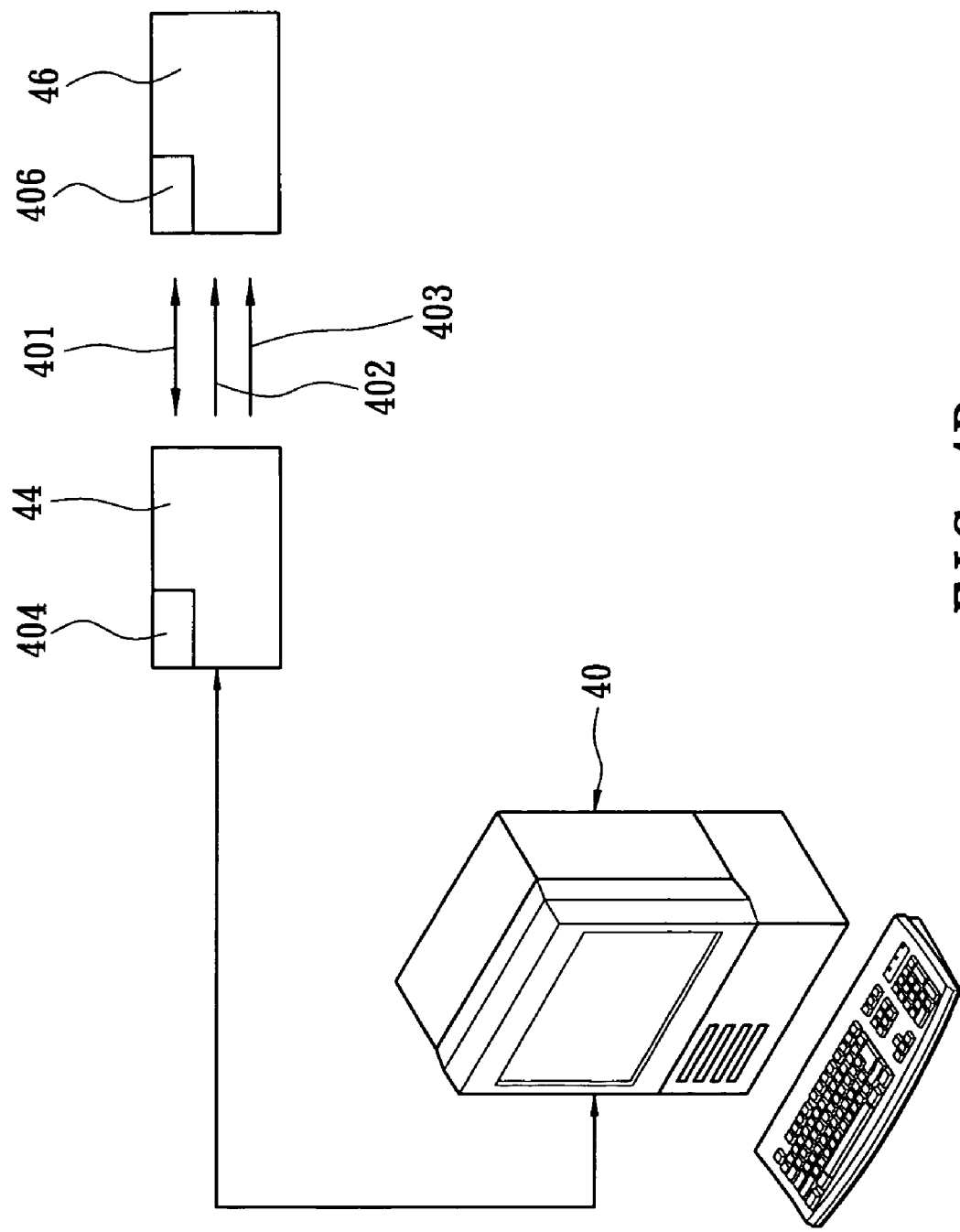
FIG. 4B is a diagram of an embodiment of the present invention using the RFID method.

Reference is made to FIG. 4B, which is a schematic diagram for illustrating the RFID mechanism in accordance with the present invention. Therein, the identification receiver 44 is connected to the host 40, which at least has a coupling unit 404. When the portable identity equipment 46 is close enough to communicate with the identification receiver 44, the coupling unit 404 will couple to the coupling unit 406 of the portable identity equipment 46.

The portable identity equipment 46 can be a passive device with no battery; thereofore, when the portable identity equipment 46 communicates with the identification receiver 44, the portable identity equipment 46 is driven by a power signal 403 sent from the identification receiver 44, in which the power signal 403 is used to provide electric power. Meanwhile, the identification receiver 44 sends out a clock signal 402. The coupling units 404 and 406 will then exchange at least a set of identification data 401. In another embodiment of the present invention, the portable identity equipment 46 can automatically generate an identification password when the connection to the identification receiver 44 is established. Then, the user can use the identification password singly or together with other identification mechanisms to log in the system.

When the portable identity equipment 46 is disconnected from the identification receiver 44, e.g. the user leaves the detected area or the host 40 is idle for a specific time interval, the automatic control and management system of the present invention automatically logs out. If the user intends to continue his/her work, another connection with the host 40 should be re-established.

The present invention is a control and management system for automatic identification or logout. Reference is made to FIG. 5A, which is the second embodiment of the present invention. The host 40 has an identity receiver 50. The identity receiver 50 is hung on, for example, a finger of the user 42 to check up his/her pulse or other biological conditions, such as brain waves, heartbeats, or breath, to establish a connection between the user 42 and the host 40. The present invention can also be used together with a password mechanism or a biological identification mechanism, such as a fingerprint identification mechanism. When disconnection occurs, such as the user is left or dead, i.e. the user has no pulse, the system automatically logs out or deletes the important data stored inside the host 40 to prevent the leakage of the data.

Figure 5B:
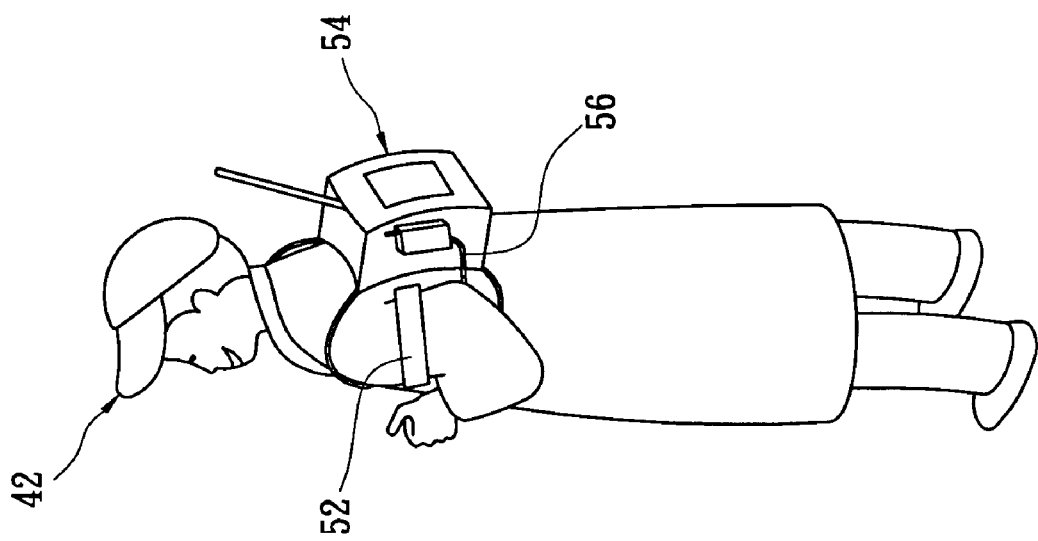
FIG. 5B is a diagram of a third embodiment of the present invention.

FIG. 5B shows a user 42 with an automatic identification device 54 connected to an identity equipment 52 through a cable 56, or through a radio frequency. The identity equipment 52 can detect a biological condition, such as pulse, heartbeat or the like, of the user 42 as a reference. Meanwhile, the identity equipment 52 informs the automatic identification device 54 to log out from the system or to disable or delete the confidential data to prevent the leakage of the data when the disconnection occurs, e.g. the system is grabbed or the user is dead.

The present invention is an automatic control and management system for identification, which includes an installation process of the identity equipment, a login process, and an auto-logout process. After the identity equipment is installed, the login process is performed. Then, after the login process is finished, the present invention periodically checks an identification value to detect whether the connection between the identity equipment and login system of the host is failed or not.

Figure 6:
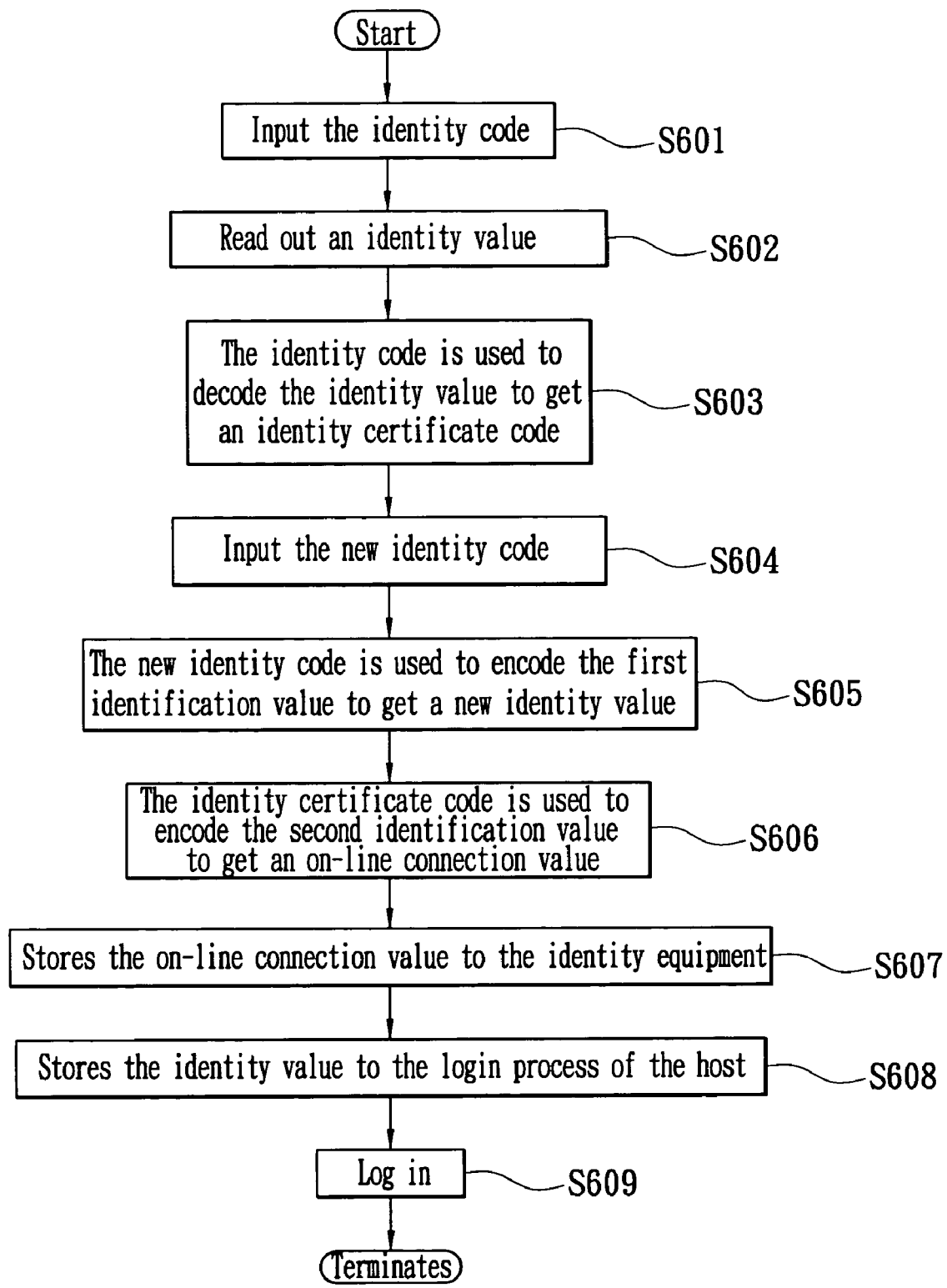
FIG. 6 illustrates installation processes of the identity equipment of the present invention.

FIG. 6 shows a flowchart of the present invention. Before using the identity equipment, the connection between the identity equipment and the login system has to be established.

The installation process of the identity equipment includes steps as follows. In step 601, the user uses the identity equipment, such as an RFID card, to input the first identity code into the system, in which the first identity code is defined by the initialization system. In step 602, the system uses the first identity code to read out the first identity value generated by the system. In step 603, the first identity code is used to decode the first identity value generated by the system to obtain an identity certificate code. In practice, the user can use an identity certificate code generated by the system or a self-defined one. In step 604, the system asks for inputting a new identity code, i.e. the second identity code, to substitute for the first identity code given initially in Step 601. In step 605, the second identity code is used to encode a first identification value to generate a second identity value. The first identification value can be a unique random value, or a value calculated by using various data, such as adding up the identity certificate code generated by Step 603, the hardware serial number and the generation time of the first identification value (identity certificate code+hardware serial number+generation time). Hence, the second identity value generated in this step is a unique and random number.

Figure 7:
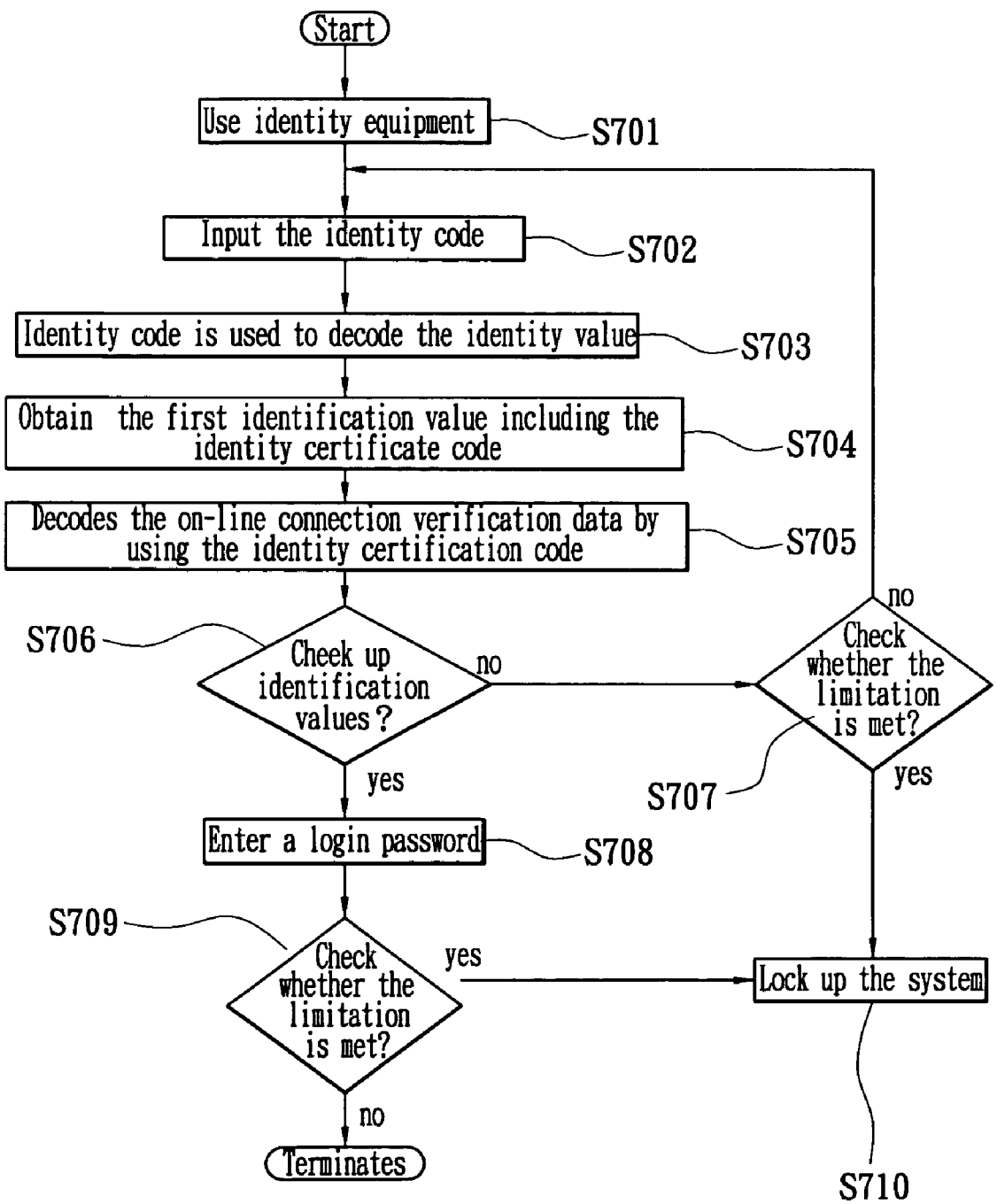
FIG. 7 illustrates the process for logging into the host of the present invention.

In step 606, the identity certificate code generated by Step 603 is used to encode a random-generated second identification value to get a connection verification data. The second identification value is an element of the first identification value. The second identification value can be the generation time described in Step 605. In step 607, the connection verification data is stored in the identity equipment, which can be an RFID card, chip card or other equipments that can be used for identification and have a memory inside. In Step 608, the identity value is stored in the login system of the host. Step 608 can be performed before or after Step 607 is performed. It is used to respectively store the connection verification data and the identity value into the identity equipment and the login system of the host. When a user logs in the system, the login process as shown in FIG. 7 is activated to verify whether the connection between the identity equipment and the login system of the host is correct or not so as to identify the user's identity. In step 609, when the above steps are completed, the login process or detection process can then take place.

The above steps complete the installation of identity equipment. If the lost identity equipment is picked up, it is still unusable for unauthorized people, and the person who lost the identity equipment only needs to cancel the setting about the lost identity equipment and then repeat the above steps to install the identity equipment.

The login process of the present invention is shown in FIG. 7, which is a decoding process for the installation process shown in FIG. 6 and includes following steps. In step 701, a user uses the portable identity equipment (an RFID card or IC card) through a contact or non-contact manner, a radio frequency or a cable to connect with the login system of the host. In step 702, the login system of the host asks for inputting an identity code, which is the second identity code set in the installation process shown in FIG. 6. In step 703, the identity code is used to decode the identity value, such as the second identity value described in FIG. 6, which is read out by the system. In step 704, the first identification value including the identity certificate code is obtained through step 703, in which, as shown in FIG. 6, the first identity value can be "identity certificate code+hardware serial number+generation time". In step 705, the identity certificate code obtained in Step 704 is used to decode the connection verification data stored inside the identity equipment. As shown in FIG. 6, the connection verification data is generated by using the identity certificate code to encode the second identification value. Hence, this step is used to perform a decoding process to recover the second identification value. In step 706, the identification values are checked to determine whether their variables are matched or not. It means that the variables of the first identification value obtained in Step 704 are compared with the variables of the second identification value obtained in Step 705 to determine whether the obtained identification values are matched or not, in which the variables can be the hardware serial number or the generation time of the first identification value. In step 707, the limitation is analyzed. Suppose that the identification values are unmatched, the login-related information (such as login frequency and login time) is recoded. This step is used to prevent the inconvenience caused by inputting an erroneous password carelessly or the unauthorized attack for trying to crack the password. Therefore, it is necessary to set a reasonable limitation, such as the login frequency during a predetermined time interval or the number of erroneous password inputting. If the limitation is met, then jump to step S710 to lock up the system and reject any further login attempts, or even delete the internal confidential data to prevent unauthorized access. Otherwise, return to Step 702. In step 708, if the identification values are matched, the user can input a login password to log in the system. In step 709, the limitation for inputting the login password is analyzed. The present invention provides a reasonable limitation to prevent the inconvenience caused by carelessly inputting an erroneous password or the unauthorized attack for trying to crack the password. Therefore, it is also necessary to set a reasonable limitation for inputting the login password. The limitation can be the login frequency during a predetermined time interval or the number of erroneous password inputting (in practice, the present invention isn't limited in these implements manners). If the limitation is met, jump to step S710 to lock up the system and reject any further login attempts, or even delete the internal confidential data to prevent unauthorized access. Otherwise, the login process is completed and terminated. After the login process is completed, the user can freely use the host computer and the confidential files inside until the disconnection between the portable identity equipment and the login system occurs.

Figure 8:
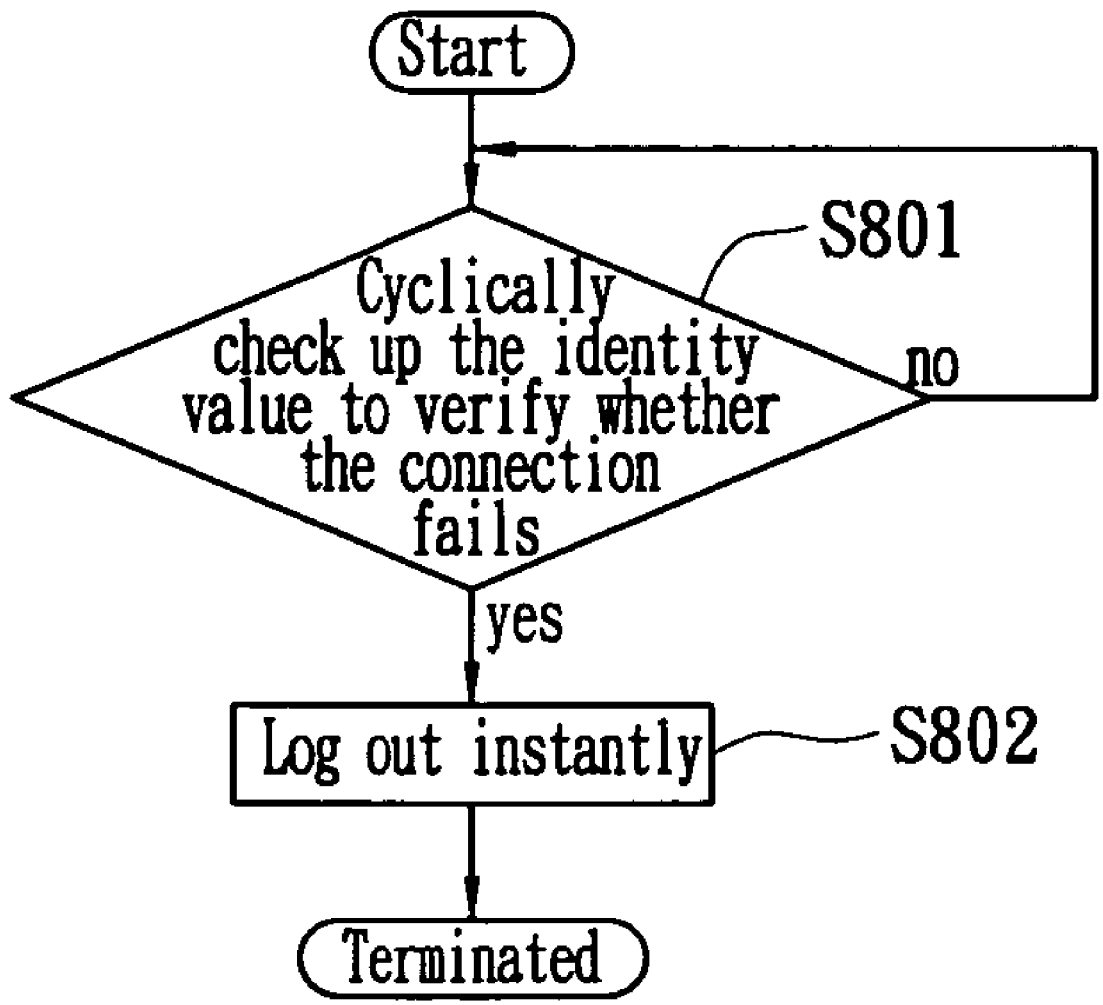
FIG. 8 illustrates the auto-logout process of the present invention.

FIG. 8 shows the auto-logout process of the present invention. If the connection between the identity equipment and the login system of the host fails because the user is left, the computer is idle for a long time, the user is dead or the identity equipment is stolen, then this auto-logout process is performed. The auto-logout process has following steps.

As shown in FIG. 6, the self-defined identity code is encrypted with a set of identification value to generate the identity value. As shown in FIG. 7, the identity code is used to decrypt the identity value to get the hardware serial number and the generation time of the first identification value. In step S801, the auto-logout process cyclically analyzes the identity value to check the connection condition between the identity equipment (such as an RFID card or IC card) and the login process. The auto-logout process keeps checking the connection condition cyclically until it finds the disconnection occurs between the portable identity equipment and the login system.

In step S802, when the disconnection occurs, the auto-logout process is instantly executed to prevent unauthorized access or usage. If the system is used in an area such as a security department or battlefield, either the information stored inside the host is automatically deleted or the computer is shut down immediately when disconnection occurs. The auto-logout process is terminated when the system logs out.

Figure 9:
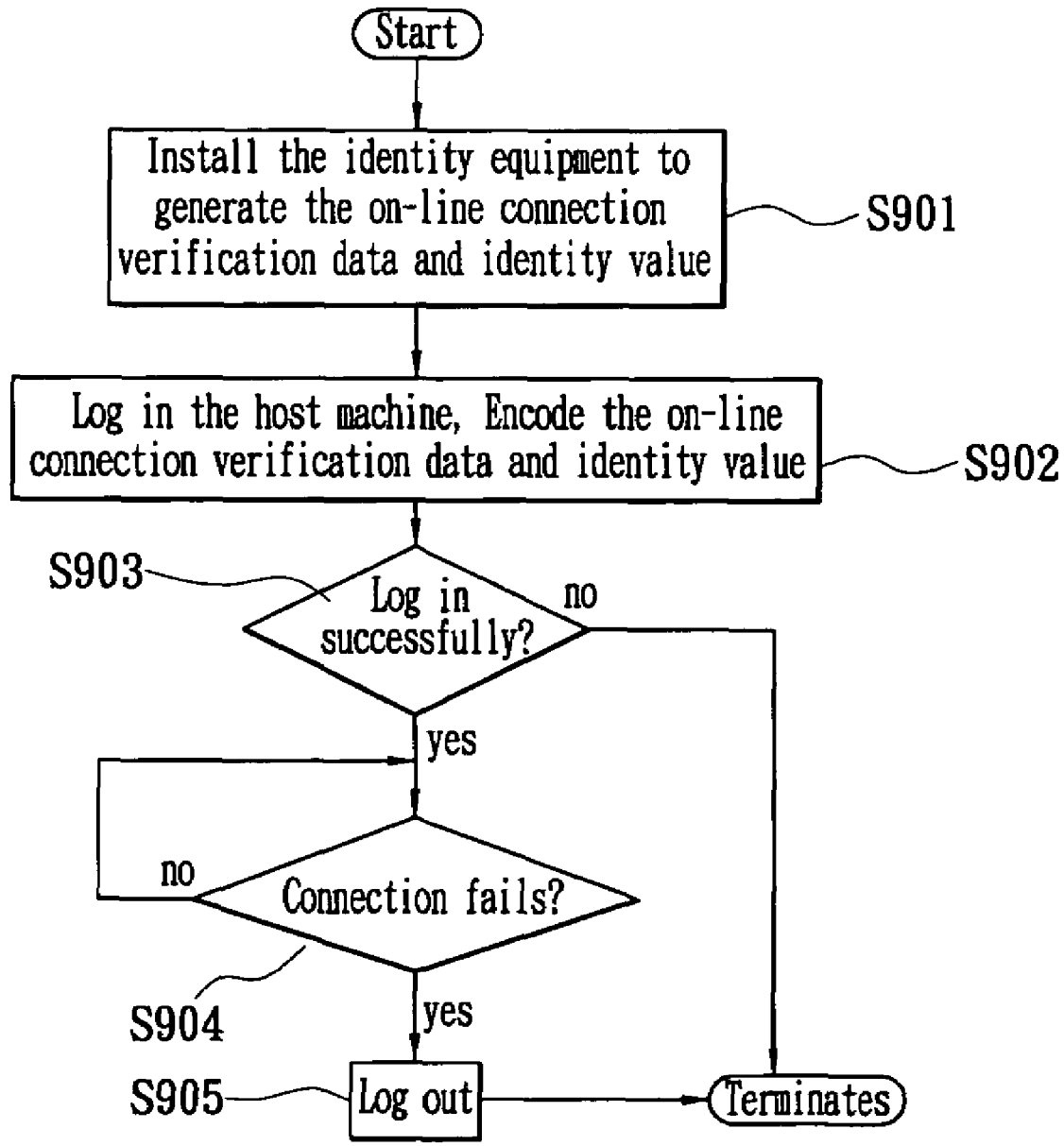
FIG. 9 illustrates the data flow diagram of the present invention.

Summing up, as shown in FIG. 9, the method for automatic identification control and management provided in accordance with the present invention has following steps.

In step S901, an installation process of the identity equipment generates the connection identification data and identity value. In step S902, a login process decodes the connection identification data and the identity value for identification. In step S903, an analysis process checks the login state. If the user fails to login, then the system is terminated. In step S904, if the user logs in successfully, then cyclic analysis of the connection condition continues until the system logs out.

In step S905, if disconnection occurs, the system automatically logs out and then shuts down.

The present invention includes the installation process of the identity equipment, the login process, and the auto-logout process of the system. The present invention provides a usable, novel and advantageous system to overcome the disadvantages of current systems.

Above is the optimal embodiment of present invention; it is apparent that various changes and modifications can be made without departing from the scope of the invention as defined in the claims.

What is claimed is:

1. A method for automatic identification control and management, including an installation process of an identity equipment, a login process to log in a host, and an auto-logout process of a host, the method comprising:

(a) installing the identity equipment for generating a connection verification data and an identity value, the step of installing including:

(i) inputting a first identity code;
(ii) reading out a first identity value generated by the login process of the host;
(iii) decoding the first identity value of the login process by using the first identity code to get an identity certificate code;
(iv) inputting a second identity code to replace the first identity code;
(v) encoding a first identification value by using the second identity code to generate a second identity value, the first identification value being obtained by adding up the identity certificate code, a hardware serial of the host and a generation time;
(vi) encoding a second identification value by using the identity certificate code to generate on-line connection verification data, the second identification value being one element of the first identification value;
(vii) storing the connection verification data in the identity equipment; and,
(viii) storing the second identity value into the host;
(b) logging in the host to decode the connection verification data and the identity value for verifying an identification value;
(c) cyclically checking a connection condition between the identity equipment and the host after successful login; and
(d) jogging out the system automatically if the connection between the identity equipment and the host fails.

2. The method as recited in claim 1, wherein, in the step of getting the identity certificate code, the identity certificate code is defined by a user.

3. The method as recited in claim 1, wherein the first identification value is a unique random number.

4. The method as recited in claim 1, wherein the login process includes:
connecting to the host by using the identity equipment;
inputting an identity code;
decoding the identity value read out from the host by using the identity code to obtain a first identification value;
decoding the connection verification data stored inside the identity equipment by using an identity certificate code to obtain a second identification value;
comparing variables of the first identification value and the second identification value; and
inputting a login password to log into the host if comparison is consistent.

5. The method as recited in claim 4, wherein the first identification value is obtained by adding up the identity certificate code, a hardware serial of the host and a generation time.

6. The method as recited in claim 4, wherein the step of comparing variables employs a limitation, wherein the login process logs out, locks up or restricts access to the host when the limitation is met.

7. The method as recited in claim 4, wherein the step of inputting the login password employs a limitation, wherein the login process logs out, locks up or restricts access to the host when the limitation is met.

8. The method as recited in claim 1, wherein the auto-logout process is activated instantly after the identity equipment is installed and login of the host is completed, the auto-logout process including:
cyclically checking the identity value to analyze a connection condition between the identity equipment and the host; and
logging out instantly if the connection between the identity equipment and the host fails.

9. A method for installing an identity equipment, which is a process for installing the identity equipment into a host, the method including:
inputting a first identity code;
reading out a first identity value generated by a login process of the host;
decoding the first identity value generated by the login process of the host by using the first identity code to obtain an identity certificate code;
inputting a second identity code to replace the first identity code;
encoding a first identification value by using the second identity code to generate a second identity value, the first identification value being obtained by adding up the identity certificate code, a hardware serial of the host and a generation time;
encoding a second identification value by using the identity certificate code to generate on-line connection verification data, wherein the second identification value is one element of the first identification value;
storing the connection verification data in the identity equipment; and
storing the second identity value in the host.

10. The method as recited in claim 9, wherein, in the step of getting the identity certificate code, the identity certificate code is defined by a user.

11. The method as recited in claim 9, wherein the first identification value is a unique random number.

* * * * *